United States Patent
Vasan et al.

(10) Patent No.: US 9,213,384 B2
(45) Date of Patent: Dec. 15, 2015

(54) GENERATION OF ENERGY CONSUMPTION PROFILES

(75) Inventors: Arunchandar Vasan, Chennai (IN); Anand Sivasubramaniam, University Park, PA (US); Rajesh Jayaprakash, Chennai (IN); Perumal Rajaram, Chennai (IN); Rajesh Subbiah, Chennai (IN); Praveen Orvakanti, Chennai (IN); Sivabalan Thirunavukkarasu, Chennai (IN)

(73) Assignee: Tata Consultancy Services Limited (IN)

( * ) Notice: Subject to any disclaimer, the term of this patent is extended or adjusted under 35 U.S.C. 154(b) by 310 days.

(21) Appl. No.: 13/818,995

(22) PCT Filed: Aug. 23, 2011

(86) PCT No.: PCT/IN2011/000565
§ 371 (c)(1),
(2), (4) Date: Jul. 24, 2013

(87) PCT Pub. No.: WO2012/025938
PCT Pub. Date: Mar. 1, 2012

(65) Prior Publication Data
US 2013/0305075 A1 Nov. 14, 2013

(30) Foreign Application Priority Data

Aug. 26, 2010 (IN) .......................... 2385/MUM/2010

(51) Int. Cl.
*G06F 1/32* (2006.01)
*G06F 1/28* (2006.01)
(Continued)

(52) U.S. Cl.
CPC .............. *G06F 1/28* (2013.01); *G06F 11/3062* (2013.01); *G06F 11/3409* (2013.01); *G06F 11/3452* (2013.01); *Y02B 60/165* (2013.01)

(58) Field of Classification Search
CPC .......... G06F 1/28; G06F 1/32; G06F 11/3062
USPC .................................................. 713/320, 340
See application file for complete search history.

(56) References Cited

U.S. PATENT DOCUMENTS 7,386,739 B2 * 6/2008 Ghiasi et al. .................. 713/300
7,461,274 B2 * 12/2008 Merkin .......................... 713/300
(Continued)

FOREIGN PATENT DOCUMENTS

EP 1931113 A1 6/2008

OTHER PUBLICATIONS

"International Application No. PCT/IN2011/000565, International Search Report mailed Jan. 3, 2012", 3 pgs.

*Primary Examiner* — Chun Cao
(74) *Attorney, Agent, or Firm* — Schwegman Lundberg & Woessner, P.A.

(57) ABSTRACT

The subject matter described herein relates to a system and a method for generation of energy consumption profiles corresponding to a plurality of computing systems. For each of the plurality of the computing systems, a plurality of consumption parameters from at least one measurement device is received. The consumption parameters include a processor utilization parameter and an energy consumption parameter. Further, a normalization factor corresponding to each of the plurality of the computing systems is identified. Based on the normalization factor, the processor utilization parameter is normalized. Based on the normalized processor utilization parameter and the energy consumption parameter, the energy consumption profile is generated. The energy consumption profile is indicative of energy efficiency of the plurality of the computing systems.

15 Claims, 4 Drawing Sheets

(51) Int. Cl.
    *G06F 11/30*   (2006.01)
    *G06F 11/34*   (2006.01)

(56) References Cited

U.S. PATENT DOCUMENTS

| | | | |
|---|---|---|---|
| 7,844,839 B2 * | 11/2010 | Palmer et al. | 713/300 |
| 8,276,008 B2 * | 9/2012 | Jackson | 713/300 |
| 8,429,431 B2 * | 4/2013 | Malik et al. | 713/300 |
| 8,458,500 B2 * | 6/2013 | Akers et al. | 713/320 |
| 8,700,929 B1 * | 4/2014 | Weber et al. | 713/310 |
| 8,949,646 B1 * | 2/2015 | Weber et al. | 713/340 |
| 8,996,890 B2 * | 3/2015 | Cox et al. | 713/300 |
| 2006/0225079 A1 | 10/2006 | Nayak et al. | |
| 2009/0144566 A1 | 6/2009 | Bletsch et al. | |
| 2010/0005331 A1 | 1/2010 | Somasundaram et al. | |

\* cited by examiner

GENERATION OF ENERGY CONSUMPTION PROFILES

PRIORITY CLAIM TO RELATED APPLICATIONS

This application is a national stage application under 35 U.S.C. §371 of PCT/IN2011/000565, filed Aug. 23, 2011, and published as WO 2012/025938 A1 on Mar. 1, 2012, which claims priority to Indian Application No. 2385/MUM/2010, filed Aug. 26, 2010, which application and publication are incorporated by reference as if reproduced herein and made a part hereof in their entirety, and the benefit of priority of each of which is claimed herein.

The present subject matter relates, in general, to generation of energy consumption profiles and, in particular, to generation of energy consumption profiles of computing systems.

BACKGROUND

Organizations, irrespective of the kind of business they are involved in, are increasingly dependent on their computing facilities. Data-centers equipped with various computing systems, such as application servers, networking devices and storage devices, are deployed by the organizations to cater to the information or computing services requested by the users. Generally, computing devices, their cooling fans, and other peripheral devices are supplied with power for their proper functioning.

Given today's challenging business environment and environmental standards, such as, energy star rating system, many organizations are prompted to consider optimizing the power consumed by the various computing systems, in addition to paying attention to the traditional aspects of the data centers, such as the amount of data storage and the processing speed of the computing systems. In order to manage and optimize energy consumption, various techniques, such as consolidation or virtualization, are employed. The consolidation techniques optimize the energy consumption by reducing the number of the computing systems in a data center, while the virtualization techniques optimize the energy consumption by enhancing efficiency of the computing system without added hardware. These techniques are employed based on, among other things, energy consumed by the computing systems within the data centers. However, the conventional techniques may provide an incomplete profile of the energy consumption of the computing systems and the data centers. Consequently, the techniques employed to manage energy consumption may not be used to maximum potential.

SUMMARY

This summary is provided to introduce concepts related to generation of energy consumption profiles, which are further described below in the detailed description. This summary is not intended to identify essential features of the claimed subject matter nor is it intended for use in determining or limiting the scope of the claimed subject matter.

Method(s) and system(s) for generation of energy consumption profiles are described herein. In one implementation, consumption parameters corresponding to a plurality of computing systems in a datacenter are received from a measuring device. The consumption parameters include processor utilization, energy consumption, etc. Further, for each computing system, a normalization factor is identified. Based on the normalization factor, the processor utilization parameter is normalized. The normalization facilitates comparison of processor utilization parameters of various computing systems, which may have different configurations. Subsequently, the processor utilization parameter is fractionally normalized. Based at least on the fractional processor utilization parameter, an energy consumption profile is generated. The energy consumption profile is indicative of energy efficiency of various computing systems in the data-center.

BRIEF DESCRIPTION OF THE DRAWINGS

The detailed description is provided with reference to the accompanying figures. In the figures, the left-most digit(s) of a reference number identifies the figure in which the reference number first appears The same numbers are used throughout the drawings to reference like features and components.

DETAILED DESCRIPTION

Figure 1:
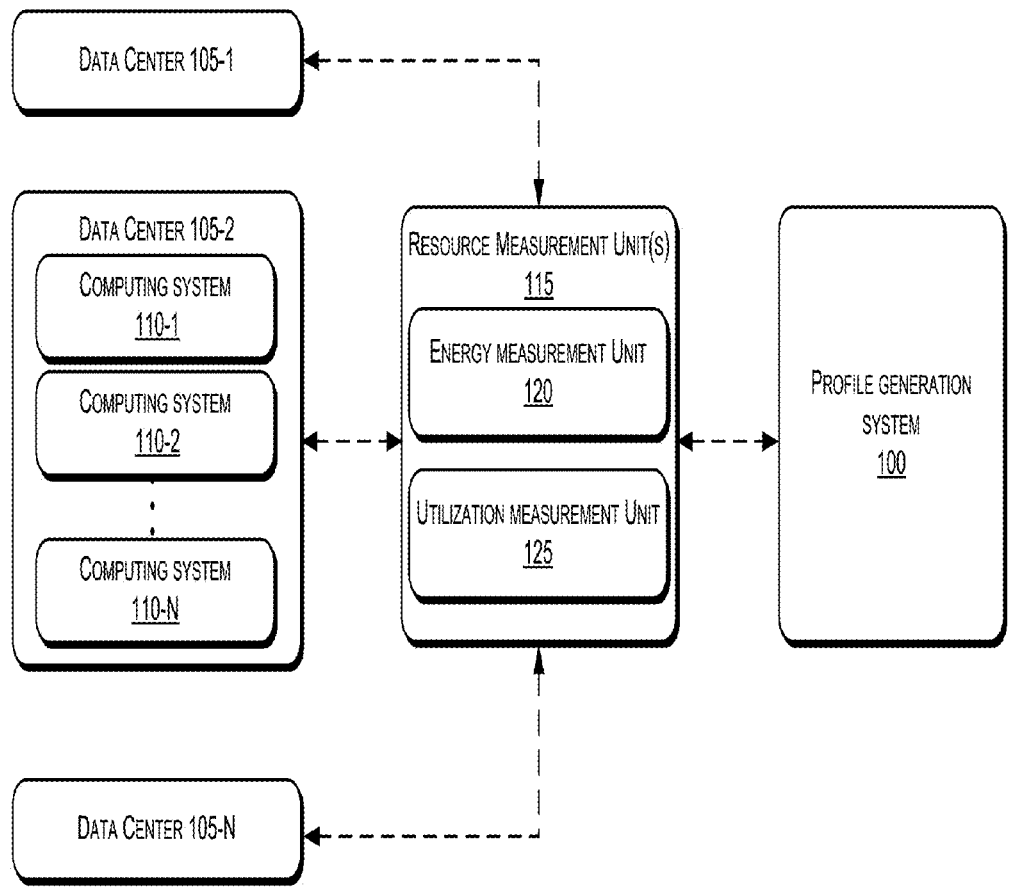
FIG. 1 illustrates an exemplary computing environment implementing generation of energy consumption profiles, in accordance with an embodiment of the present subject matter.

Systems and methods for generation of energy consumption profiles are described herein. The energy consumption profile can be generated for a plurality of computing systems in a data-center. The systems and methods, related to generation of the energy consumption profiles, described herein, can be implemented for a variety of computing systems, such as a server, a desktop computer, a notebook or a portable computer, a mainframe computer, a mobile computing device, and, an entertainment device.

Typically, organizations employ one or more data-centers that accommodate computing infrastructure, such as computing systems, storage devices, routers and switches, which enable the organizations to operate round the clock and use the computing infrastructure according to their business needs. The computing systems can be servers, for example, mainframes, web servers, application servers, file and print servers, and messaging servers. Typically, a computing system may have one or more energy consuming resources, such as a processor and a cooling fan. Different computing systems can be of different configurations having resources of different power consumption ratings, for example, one server can have a single core processor with a clock speed of, say, 4 Gigahertz (GHz), while another server can have a multi-core processor with a clock speed of, say, 2 GHz. Further, energy consumption of different computing systems varies according to the configuration of their resources, which may have different energy consumption ratings. For example, a computing system having a processor operating at a clock speed higher than that of a processor of another computing system may consume more energy than the other computing system for a given time-period, provided other parameters, such as processor family and information processing load are same for both the processors.

The energy consumption of a computing system for a given time period may be reduced by changing its configuration, for example, selecting a processor of reduced clock speed, to achieve an energy efficient data-center. Changes in the configuration of the computing systems may achieve the required energy efficiency, however, it may affect computing capabilities of the data-center and consequently may adversely affect business needs of the organization. In order to maintain energy efficient data-centers, energy consumed by the resources of the computing systems in the data-centers can be monitored and managed accordingly. The energy consumption of the computing systems in a data-center is optimized using various energy management techniques, such as consolidation or virtualization or both.

These energy management techniques are implemented based on, among other things, energy consumed by the computing systems. To compute energy consumed by the computing systems in a data center and, accordingly, identify opportunities for improving the energy efficiency of the data-centers, various energy consumption computation techniques are implemented. However, conventional energy consumption computation techniques may not provide adequate analysis to identify computing systems having resources with energy consumption rating higher than that is required for the information processing needs of the organization. For example, comparison of energy consumption of two computing systems having similar information processing loads or having similar processor utilizations, but having different configuration may not help identify the opportunities for reducing energy consumption and enhancing energy efficiency of the data-center.

According to an embodiment of the present subject matter, systems and methods for generation of energy consumption profiles are described herein. For generating the energy consumption profiles, consumption parameters for a plurality of resources of computing systems in a data-center are received. The consumption parameters can be measured instantaneously or averaged over a given time interval. The consumption parameters include, for example, utilization of a processor or processor utilization, and energy consumption of the computing system. The processor utilization parameter, hereinafter referred to as processor utilization, is indicative of the information processing load and can be indicated as the percentage of time for which a processor of a computing system is being used for processing instructions. The energy consumption indicates electrical power or a factor such as, current, and voltage, which represents electrical power consumed by a computing system.

It will be understood that, based on the preferences of a user, such as a data-center administrator, energy consumption profiles of some or all of the computing systems of a data-center can be generated.

In one implementation, at least the processor utilization, for each of the computing systems, is normalized based on a corresponding normalization factor. Normalization of consumption parameters facilitates representation of the consumption parameters of various computing systems with reference to a reference processor, hereinafter referred to as a normalization processor.

Subsequent to normalization, fractional consumption parameters may be assessed. For the purpose of explanation, a cumulative sum of a consumption parameter, which can be normalized or averaged, corresponding to all the computing systems of a data-center is referred to as a data-center consumption parameter. Fractional normalization of a consumption parameter indicate a fraction of the consumption parameter, say processor utilization, of one of the computing systems with respect to the data-center consumption parameter. In one implementation, the normalized processor utilization and the averaged energy consumption are further fractionally normalized. The fractional normalization of the consumption parameters provides fractional consumption parameter, which are analyzed further to generate an energy consumption profile. For example, the fractional normalization of the processor utilization parameter provides fractional processor utilization parameter and the fractional normalization of the energy consumption parameter provides fractional energy consumption parameter. Based on the fractionally normalized consumption parameters, an energy consumption profile corresponding to a data-center under consideration is generated. In one example, the energy consumption profile represents an association between the processor utilization and the energy consumption of the computing systems. The energy consumption profile is indicative of energy efficiency of the computing systems in the data center.

The energy consumption profile can facilitate identification, in quantitative terms, of opportunities for improving the energy efficiency of the data-centers. For example, the energy consumption profile may indicate that the current processor utilization of the data-center can be substantially met using a certain proportion of the current energy consumption. Upon identification of opportunities that can be utilized for making the data-centers energy efficient, the energy management techniques may be implemented to improve energy efficiency of the data-centers. Implementation of the energy management techniques based on the present subject matter may also free up physical space in data-centers, thereby leading to cost savings on account of reduction in space usage. Further, the total number of computing systems may decrease in a data-center upon implementation of such techniques based on the present subject matter, thereby reducing the maintenance costs associated with the data-center.

While aspects of described systems and methods for the generation of energy consumption profiles can be implemented in any number of different computing systems, environments, and/or configurations, the embodiments are described in the context of the following exemplary system(s).

Exemplary Systems

FIG. 1 illustrates an exemplary computing environment implementing generation of energy consumption profiles, according to an embodiment of the present subject matter. A profile generation system 100 is associated with one or more data-centers 105-1, 105-2, . . . , 105-N for generating the energy consumption profiles. The one or more of data-centers 105-1, 105-2, . . . , 105-N are hereinafter collectively referred to as data-centers 105. In one implementation, each of the data-centers 105 houses a plurality of computing systems 110-1, 110-2, . . . , 110-N, hereinafter collectively referred to as computing system(s) 110.

The profile generation system 100 and the computing systems 110 can be implemented using devices that include, but are not limited to, desktop computers, hand-held devices, multiprocessor systems, personal digital assistants (PDAs), laptops, network computers, cloud servers, minicomputers, mainframe computers, and the like. Although the profile generation system 100 is shown as a separate computing system, it will be understood that the profile generation system 100 can also be implemented in any of the computing systems 110.

In order to measure consumption parameters associated with the computing systems 110 in the data-centers 105, the computing systems 110 can be associated with one or more resource measurement device(s) 115. The resource measurement devices 115 in turn are associated with the profile generation system 100. Each of the resource measurement devices 115 includes, for example, an energy measurement device 120, and a utilization measurement device 125.

The energy measurement device 120 determines energy consumed by each of the computing systems 110. The utilization measurement device 125 determines processor utilization of each of the computing systems 110. The energy measurement device 120 may be, for example, a power distribution unit, which may be interfaced with each of the computing systems 110. The energy measurement device 120 can distribute the power among the computing systems 110 and can determine energy consumed by the computing systems 110. The utilization measurement device 125 may implement various techniques, for example, Configuration Management Database (CMDB) techniques, for measuring processor utilization of the computing systems 110.

Although the resource measurement device(s) 115 are illustrated external to the profile generation system 100, it will be understood that the functionalities of the one or more components of the resource measurement device(s) 115 may be internal to the profile generation system 100. For example, the utilization measurement device 125 may be internal to the profile generation system 100.

In operation, the profile generation system 100 interacts with the resource measurement devices 115 to fetch information pertaining to the consumption parameters. In one implementation, the profile generation system 100 takes an average of the consumption parameters over a predetermined time-period. Once the values for the consumption parameters are received, one or more consumption parameters, such as, processor utilization, of the various computing systems 110, which cannot be compared directly, can be normalized. Normalization facilitates a meaningful comparison amongst the energy consumptions of the computing systems 110, which may be of different configurations.

The profile generation system 100 normalizes these consumption parameters for each of the computing systems 110 in the data-center 105, based on a normalization factor corresponding to each of the computing systems 110. The normalization factor may be computed based on normalization parameters. The normalization parameters are indicative of the configuration of the normalization processor. Examples of the normalization parameters for normalization of processor utilization include, but are not limited to, processor family, processor clock speed, and number of cores in a processor.

In an implementation, once the consumption parameters are normalized, the normalized consumption parameters are further fractionally normalized. As previously mentioned, a fractional consumption parameter indicates a fraction of the consumption parameter, say energy consumption, of a computing system, such as the computing system 110-1, with respect to a data-center consumption parameter. The data-center consumption parameter can be understood as a cumulative sum of a consumption parameter, which can be normalized or averaged, corresponding to all the computing systems of a data-center. In one implementation, in case a consumption parameter is already normalized, then this normalized consumption parameter is further fractionally normalized; however, in case a consumption parameter is not normalized, then an averaged consumption parameter is fractionally normalized to give a corresponding fractional consumption parameter.

Based on the fractional consumption parameters, an energy consumption profile for the data-center, such as the data-center 105-1 is generated. The energy consumption profile illustrates an association amongst the consumption parameters of the computing systems 110. For example, the energy consumption profile depicts what percentage of processor utilization of a data-center can be achieved for a given fraction of the current energy consumption. Based on the energy consumption profiles of the data-centers 105, a data-center administrator can identify the scope for improvement in the energy efficiency and other energy consumption efficiency, like processor utilization, of the data-centers.

Figure 2:
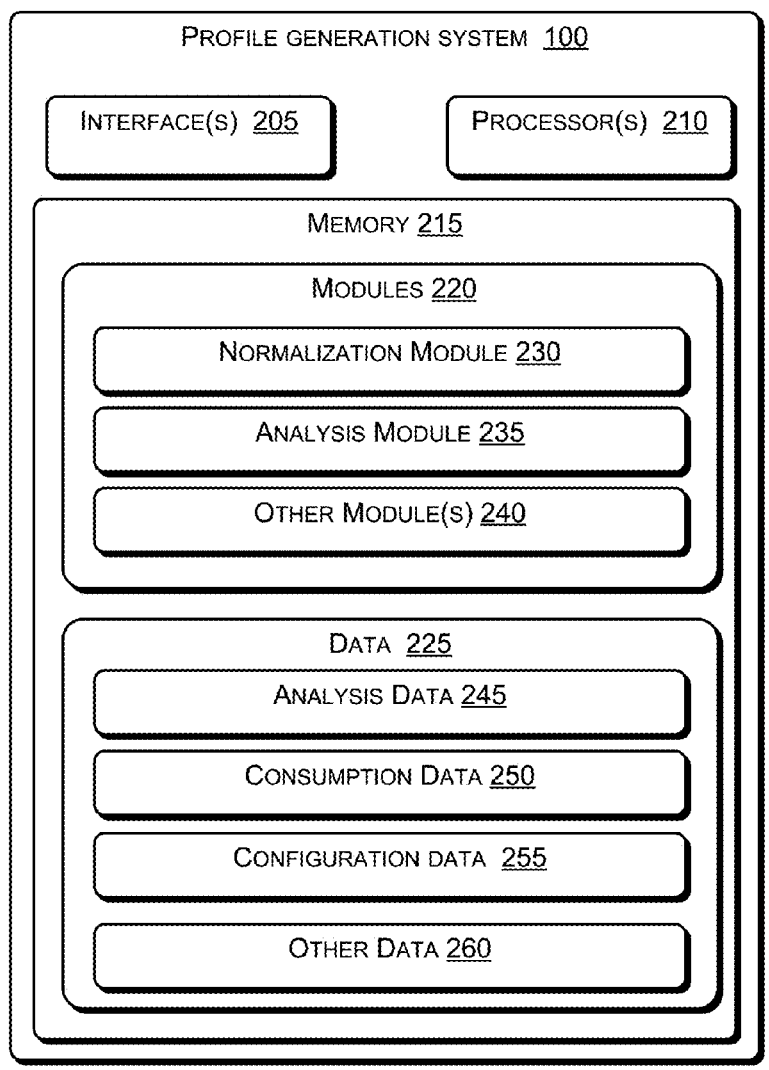
FIG. 2 illustrates exemplary components of a profile generation system, in accordance with an embodiment of the present subject matter.

FIG. 2 illustrates exemplary components of the profile generation system 100, in accordance with an embodiment of the present subject matter. The profile generation system 100 includes interface(s) 205, one or more processor(s) 210 and a memory 215 coupled to the processor(s) 210.

The interface(s) 205 may include a variety of software and hardware interfaces, for example, interfaces for peripheral device(s), such as a keyboard, a mouse, an external memory and a printer. Further, the interface(s) 205 may enable the profile generation system 100 to communicate with other computing systems, such as web servers and external databases. The interface(s) 205 can facilitate multiple communications in a wide variety of networks and protocol types, including wired networks, for example, a local area network (LAN), a cable network, etc., and wireless networks such as a Wireless LAN (WLAN), a cellular network, or a satellite network. The interface(s) 205 may include one or more ports for connecting a number of computing systems with each other or to another computing system in another computing environment. In one implementation, the profile generation system 100 communicates with the resource measurement devices 115 via the interface(s) 205.

The processors 210 may be implemented as one or more microprocessors, microcomputers, microcontrollers, digital signal processors, central processing units, state machines, logic circuitries, and/or any devices that manipulate signals based on operational instructions. Among other capabilities, the processors 210 is configured to fetch and execute computer-readable instructions and data stored in the memory 215.

The memory 215 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes.

The memory 215 includes modules 220 and data 225. The modules 220 include routines, programs, objects, components, data structures and the like, which perform particular tasks or implement particular abstract data types. The data 225 serves as a repository for storing data that may be processed, received or generated by one or more of the modules 220. The modules 220 further include, for example, a normalization module 230, an analysis module 235, and other module(s) 240. The other module(s) 240 may include modules that supplement applications on the profile generation system 100, for example, modules of an operating system. The data 225 includes, for example, analysis data 245, consumption data 250, configuration data 255, and other data 260. The other data 260 includes data corresponding to one or more of the other module(s) 240.

In operation, the profile generation system 100 interacts with the resource measurement device(s) 115 to receive consumption parameters corresponding to the computing systems 110. The consumption parameters may be received continuously or as a complete set over a predetermined time interval. The consumption parameters may be stored in the consumption data 250. In one implementation, the normalization module 230 averages the consumption parameters over the predetermined time period. The predetermined time period may be based on a cyclic nature of variations in the consumption parameters. For example, if there is an intra-day variation pattern in the consumption parameters and the variation pattern is repeated every day, the consumption parameters may be averaged over a day. In another example, if the variations are not cyclic on a daily basis, the consumption parameters can be averaged over a week. The averaged consumption parameters may be stored in the analysis data 245. However, it will be understood that the instantaneous values of the consumption parameters may also be taken.

The normalization module 230 may normalize one or more averaged consumption parameters. As previously explained, the consumption parameters are normalized so that resources consumed by the computing systems 110, which may have different configurations, can be compared for further analysis. For example, the consumption parameter, such as, processor utilization, for various computing systems cannot be compared directly and may be normalized; however the consumption parameter, such as, energy consumption of the various computing systems can be compared directly and may not be normalized. In one implementation, normalization of the consumption parameters may be performed without averaging. In an example, the normalization module 230 normalizes the processor utilization for each of the computing systems 110. The processor utilization can be an averaged processor utilization. The normalization module normalizes the processor utilization based on the corresponding normalization factor. The normalization factor can be determined based on normalization parameters corresponding to a normalization processor. The configuration of the normalization processor is expressed in terms of the normalization parameters. Examples of the normalization parameters include, but are not limited to, processor family, such as Pentium® and Xeon®, processor clock speed, and number of cores in a processor. For the purposes of explanation, the normalization parameter processor family may be referred to as $N_1$, number of cores may be referred to as $N_2$, and processor clock speed may be referred to as $N_3$.

In one implementation, the configuration of the computing systems 110 is stored in the configuration data 255. The normalization module 230 may fetch information pertaining to the computing systems 110 from the configuration data 255. For comparing the consumption parameters of the computing systems 110, which may be of different configurations, the resources, such as processors, of the computing systems 110 are expressed in terms of the normalized processor. It will be understood that normalization may be performed for other resources as well, for example, cooling fans.

In one implementation, for the purpose of comparison the computing systems 110 having processors belonging to different processor families, a benchmark application Standard Performance Evaluation Corporation(SPEC) benchmark applications like SPECint 2000 benchmark applications, is run on computing systems having processors belonging to different processor families but having same processor clock speed and same number of cores. Once the benchmark application is run, the processor performance is determined The processor performance may be determined in terms of throughput of the processors, which can be understood as the number of instructions processed per second. Upon comparing the performance of the processors belonging to different processor families, a relation between the various processor families is determined. For example, it may be determined that the performance of a 2 GHz, dual core, Xeon® processor is twice as good as that of a 2 GHz, dual core, Pentium® processor. Therefore, based on the processor family, a processor belonging to Xeon® family may have a normalization parameter $N_1$ of 1 and a processor belonging to Pentium® family may have a normalization parameter $N_1$ of 0.5. It will be understood that the relation between various processor families may also be determined based on standard data related to throughput performance published by manufacturers or data published by various organizations.

Returning to the determination of normalization factors, the normalization parameter $N_2$ can be determined based on the number of cores that a processor has, for example, if the normalization parameter $N_2$ for a processor having two cores is 1, then the normalization parameter $N_2$ for a processor having four cores would be 2. Likewise, the normalization parameter $N_3$ can be determined based on the speed of the processor clock. For example, if the normalization parameter $N_3$ for a processor having clock speed of 4 GHz is 1, then the normalization parameter $N_3$ for a processor having a clock speed of 2 GHz will be 0.5.

In one implementation, the normalization factor, say N, is a product of the normalization parameters $N_1$, $N_2$, and $N_3$:

$$N=(N_1 \times N_2 \times N_3)$$

Thus, the normalization factor indicates configuration of a processor of a computing system, such as the computing system 110-1, with reference to the normalization processor. It will be understood that the normalization factor N may be determined using other combinations of the normalization parameters, and any additional normalization parameters, as well. The normalization factors and the normalized parameters for the computing systems 110 may be stored in the configuration data 255. In one implementation, the normalization parameters and the normalization factors may be pre-stored in the configuration data 255 and the normalization module 230 may fetch data pertaining to the normalization parameters and the normalization factors from the configuration data 255.

For the purpose of explanation and not as a limitation, the determination of the normalization factor, say N, may be understood with the following example. Consider a normalization processor belonging to the Xeon® processor family, having four cores and with a clock speed 3 GHz. Further, consider processors of three computing systems, $C_1$, $C_2$, and $C_3$ with the following configuration:

TABLE 1

| Computing System | Configuration | | |
|---|---|---|---|
| | Processor Family | Number of Cores | Clock Speed (in GHz) |
| $C_1$ | Pentium ® | 2 | 2 |
| $C_2$ | Xeon ® | 4 | 3 |
| $C_3$ | Xeon ® | 2 | 3 |

The normalization parameters and the normalization factors corresponding to the computing systems are illustrated in the table 2:

TABLE 2

| Computing System | $N_1$ | $N_2$ | $N_3$ | N |
|---|---|---|---|---|
| $C_1$ | 0.5 | 0.5 | 0.66 | 0.167 |
| $C_2$ | 1 | 1 | 1 | 1 |
| $C_3$ | 1 | 0.5 | 1 | 0.5 |

As illustrated, the normalization factor N for the three computing systems $C_1$, $C_2$, and $C_3$ is 0.167, 1, and 0.5 respectively.

In another implementation, for the purpose of comparison the computing systems 110 having processors with different normalization parameters, a benchmark application, such as applications based on Transaction Processing Performance Council (TPC-C) benchmarks, is run on each of the computing systems 110. Once such a benchmark application is run, the normalization factor is directly determined.

In one implementation, subsequent to the determination of the normalization factors corresponding to the computing systems 110, the normalization module 230 normalizes the processor utilization of each of the computing systems 110. In an example, the normalization module 230, for example, computes the normalized processor utilization by taking a product of the averaged processor utilization and the normalization factors corresponding to each computing systems 110. Referring to the example cited above, the normalized processor utililization parameters for the computing systems $C_1$, $C_2$, and $C_3$ can be illustrated in the table 3. In said example, for the purpose of explanation, the energy consumption is represented, as power consumption.

TABLE 3

| Computing System | Average Processor Utilization | Average Power Consumption | N | Normalized Processor Utilization | Normalized Processor Utilization/ |
| --- | --- | --- | --- | --- | --- |
| $C_1$ | 60% | 350 W | 0.167 | 10% | 0.028 |
| $C_2$ | 50% | 290 W | 1 | 50% | 0.17 |
| $C_3$ | 45% | 300 W | 0.5 | 22.5% | 0.075 |

The processor utilization of the computing systems against a normalization processor may be indicated by the corresponding normalized processor utilization. In addition to computation of average processor utilization, the normalization module 230 may also compute normalized processor utilization per watt. The processor utilization per watt can be computed by taking a ratio of the normalized proccessor utilization to average power consumption. The normalized processor utilization and normalized processor utilization per watt may be stored in the analysis data 245.

In one implementation, the normalization module 230 further determines the fractional consumption parameters. In case a consumption parameter is normalized, then this normalized consumption parameter is further fractionally normalized; however in case a consumption parameter is not normalized, then a non-normalized consumption parameter is fractionally normalized to give fractional consumption parameters. A fractional consumption parameter can be determined, for example, by taking the ratio of a normalized consumption parameter or an averaged consumption parameter associated with a computing system, say computing system 110-1, to a sum of the normalized consumption parameters or the average consumption parameters, respectively, of all the computing systems 110 under consideration. Thus, the fractional normalization of the processor utilization parameter provides fractional processor utilization parameter and the fractional normalization of the energy consumption parameter provides fractional energy consumption parameter. Referring to the example above, the fractional consumption parameters for the three computing systems can be computed as illustrated in table 4:

TABLE 4

| Computing Systems | Fractional Processor Utilization | Fractional Energy Consumption |
| --- | --- | --- |
| $C_1$ | (10/(10 + 50 + 22.5)) = 0.12 | (350/(290 + 300 + 350)) = 0.37 |
| $C_2$ | (50/(10 + 50 + 22.5)) = 0.61 | (290/(290 + 300 + 350)) = 0.31 |
| $C_3$ | (22.5/(10 + 50 + 22.5)) = 0.27 | (300/(290 + 300 + 350)) = 0.32 |

The fractional consumption parameters determined for the computing systems 110 may stored in the analysis data 245. Subsequent to computation of the fractional consumption parameters, the analysis module 235 analyzes the fractional consumption parameters to generate an energy consumption profile for the data-center, such as the data-center 105-1, under consideration. The energy consumption profile can be represented as, for example, a table, a plot, or a combination of the two. In one implementation, the analysis module 235 computes cumulative normalized consumption parameters, say, cumulative normalized processor utilization and cumulative normalized energy consumption, for the data-center 105-1 to generate the energy consumption profile.

For computing the cumulative normalized consumption parameters, the normalization module 230 may arrange the computing systems 110 in the descending order based on an order factor, for example, normalized processor utilization per watt. Further, the computing systems 110 may be arranged in the descending order prior to the determination of the fractionally normalized consumption parameters as well based on the normalized processor utilization per watt. Referring to the example with computing systems $C_1$, $C_2$, and $C_3$, these computing systems may be arranged in the descending order as illustrated in the following table:

TABLE 5

| Computing Systems | Fractional Processor Utilization | Fractional Energy Consumption |
| --- | --- | --- |
| $C_2$ | (50/(10 + 50 + 22.5)) = 0.61 | (290/(290 + 300 + 350)) = 0.31 |
| $C_3$ | (22.5/(10 + 50 + 22.5)) = 0.27 | (300/(290 + 300 + 350)) = 0.32 |
| $C_1$ | (10/(10 + 50 + 22.5)) = 0.12 | (350/(290 + 300 + 350)) = 0.37 |

For the purpose of explanation, the computation of the cumulative normalized consumption parameters is explained with respect to the previously discussed example considering three computing systems $C_1$, $C_2$, and $C_3$. In said example, the resource generation profile is represented as table, which is illustrated below:

TABLE 6

| Computing Systems | Cumulative Normalized Processor Utilization | Cumulative Normalized Energy Consumption |
|---|---|---|
| $C_2$ | 0.61 | 0.31 |
| $C_2 + C_3$ | 0.61 + 0.27 = 0.88 | 0.31 + 0.32 = 0.63 |
| $C_2 + C_3 + C_1$ | 0.61 + 0.27 + 0.12 = 1.00 | 0.31 + 0.32 + 0.37 = 1.00 |

As illustrated, the cumulative consumption parameters for a data-center having the computing systems $C_1$, $C_2$, and $C_3$ are computed by first considering a computing system having maximum value of the order factor and then considering a combination of a computing system having second maximum value of the order factor and the computing system considered prior to it, and so on. It will be understood that the process for computing cumulative normalized consumption parameters explained above can be extended to a data-center, such as the data-center 105, having any number of computing systems, such as computing systems 110.

In one example, the energy consumption profile maps different levels of cumulative normalized processor utilization to a minimum energy consumption that can achieve that level of processor utilization. The table 6 indicates that 88% of the processor utilization, which is a sum of the processor utilizations of the computing systems $C_2$ and $C_3$, of a data-center accommodating these computing systems can be met with 63% of the current energy consumption of the data-center, thereby indicating scope for improvement in the energy efficiency of the data-center. Upon identifying such scope, various energy management techniques may be implemented, for example, consolidation, virtualization, or turning off the power supply to the computing systems, which are idle or have low processor utilization. The consolidation techniques optimize the energy consumption by reducing the number of the computing systems in a data center, while the virtualization techniques optimize the energy consumption by enhancing efficiency of the computing system without added hardware.

Figure 3:
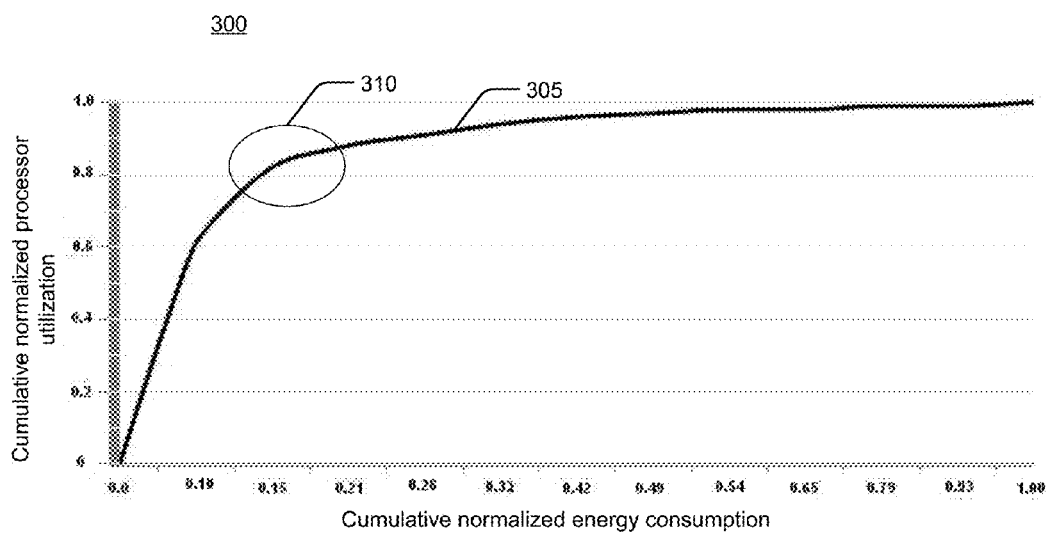
FIG. 3 illustrates exemplary energy consumption profile, according to an embodiment of the present subject matter.

In one implementation, the energy consumption profile can also be represented as a cumulative normalized processor utilization vs. cumulative normalized energy consumption plot, such as plot 300 illustrated in FIG. 3. As illustrated, the ordinate is cumulative normalized processor utilization and the abscissa of the plot is cumulative normalized energy consumption. The plot 300 depicts variation in the cumulative normalized processor utilization with variations in cumulative normalized energy consumption in the form of an energy consumption curve 305. The energy consumption curve 305 is a knee-shaped curve, which indicates that the cumulative normalized processor utilization increases with the cumulative normalized energy consumption till a knee point 310. However, after the knee point 310, the cumulative normalized processor utilization increases marginally even after a substantial increase in the cumulative normalized energy consumption. The knee point 310 indicates that about 82% of the processor utilization of the data-center can be achieved with 15% of current energy consumption, thereby indicating an opportunity for enhancing energy efficiency of the data-center.

The energy consumption profile is indicative of energy efficiency of the computing systems 110 in the data center 105. The energy efficiency of a computing system can be understood to be a ratio of the processor utilization to the energy consumption. In one implementation, the energy efficiency of a computing system is the ratio of the normalized processor utilization to the energy consumption. It may understood that a higher ratio indicates a higher energy efficiency of a computing system. Further, a computing system having energy efficiency less than threshold energy indicates that the computing system has lower energy efficiency. Subsequently, energy management techniques may be implemented on such computing systems to enhance the energy efficiency of the data-center accommodating these computing systems.

Figure 4:
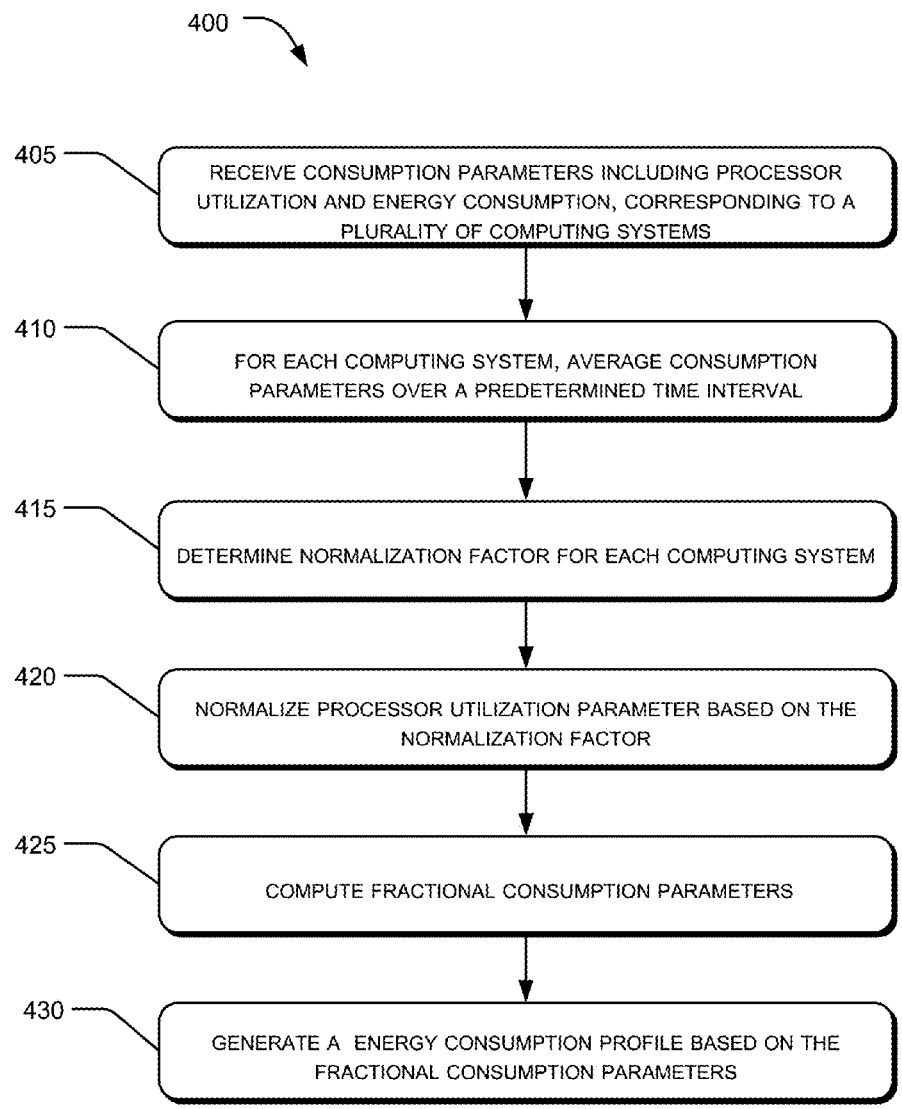
FIG. 4 illustrates a method for generating energy consumption profiles, in accordance with an embodiment of the present subject matter.

FIG. 4 illustrates a method 400 for generating energy consumption profiles, in accordance with an embodiment of the present subject matter.

The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method are described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is presently provided for a query sequence. It would be appreciated that the same method can also be implemented for a plurality of query sequences without deviating from the scope of the present subject matter.

At block 405, consumption parameters corresponding to a plurality of computing systems in data-center are received. The energy consumption parameter includes, for example, processor utilization and energy consumption. In one implementation, the resource measurement devices 115 provide consumption parameters to the normalization module 230. The consumption parameters are stored in the consumption data 250.

At block 410, the consumption parameters for each of the computing systems are averaged over a predetermined time period. For example, the normalization module 230 averages the consumption parameters and stores the averaged consumption parameters in the analysis data 245.

At block 415, normalization factor corresponding to each computing system is determined. In one implementation, the normalization factor is determined based on the normalization parameters, which are indicative of a configuration of the computing systems. For example, the normalization module 230 determines normalization factor corresponding to the computing systems and normalizes the consumption parameters, for instance, by taking a product of the normalization factor and the consumption parameter. The normalization factors and parameters are stored in the configuration data 255.

At block 420, at least one consumption parameter, for instance, processor utilization, for each of the computing systems is normalized based on a normalization factor corresponding to a computing system under consideration. In one implementation, the normalization module 230 normalizes the processor utilization for each computing system.

At block 425, the consumption parameters are fractionally normalized. In one implementation, the normalization module 230 fractionally normalizes the consumption parameters to determine fractional consumption parameters. For example, the normalized processor utilization and the averaged energy consumption are further fractionally normalized to provide fractional processor utilization parameter and fractional energy consumption parameter respectively.

At block 430, an energy consumption profile is generated based on the fractional consumption parameters. For example, the energy consumption profile is generated by computing cumulative normalized consumption parameters. In one implementation, the analysis module 235 analyzes the fractional consumption parameters to generate the energy consumption profile. The energy consumption profile is indicative of energy efficiency of the computing systems in the data center. Thus, the energy consumption profile is indicative of the opportunities for improving energy-efficiency of a data-center housing the computing devices.

Although embodiments for the generation of the energy consumption profiles have been described in language specific to structural features and/or methods, it is to be understood that the invention is not necessarily limited to the specific features or methods described. Rather, the specific features and methods are disclosed as exemplary embodiments for the energy consumption profiles.

We claim:

1. A profile generation system comprising:
   a processor; and
   a memory coupled to the processor, the memory comprising,
      a normalization module configured to:
         identify a normalization factor corresponding to each of a plurality of computing systems, wherein the normalization factor indicates configuration of a processor of a computing system with respect to a reference processor;
         normalize a processor utilization parameter of each of the plurality of computing systems, based on the normalization factor, wherein the processor utilization parameter is indicative of a percentage of time for which the processor of the computing system is being used for processing instructions; and
         fractionally normalize the normalized processor utilization parameter of each of the plurality of computing systems to obtain a corresponding fractional processor utilization parameter, wherein the fractional processor utilization parameter of the computing system is a ratio of the normalized processor utilization parameter to a data-center consumption parameter corresponding to processor utilization, the data-center consumption parameter being indicative of cumulative sum of normalized processor utilizations of the plurality of computing systems; and
      an analysis module configured to generate an energy consumption profile for the plurality of computing systems based on the fractional processor utilization parameter of the plurality of computing systems, wherein the energy consumption profile is indicative of an association between the processor utilization and energy consumption of the plurality of computing systems.

2. The profile generation system as claimed in claim 1, wherein the normalization module is configured to average, for each of the plurality of computing systems, the processor utilization parameter and an energy consumption parameter over a predetermined time-interval.

3. The profile generation system as claimed in claim 1, wherein the normalization module is configured to fractionally normalize an energy consumption parameter of each of the plurality of computing systems, to obtain a fractional energy consumption parameter, and wherein the fractional energy consumption parameter is a ratio of the energy consumption parameter and a data-center consumption parameter corresponding to the energy consumption, and wherein the data-center consumption parameter corresponding to the energy consumption is indicative of cumulative sum of energy consumptions of the plurality of computing systems.

4. The profile generation system as claimed in claim 1, wherein the normalization module is configured to determine a normalization factor based on at least one normalization parameter, the at least one normalization parameter being indicative of a configuration of the reference processor.

5. The profile generation system as claimed in claim 4, wherein the at least one normalization parameter is selected from the group consisting of a processor family, a processor clock speed, and a number of cores in a processor.

6. The profile generation system as claimed in claim 1, wherein the analysis module is configured to compute cumulative consumption parameters for the plurality of computing systems, based on fractional consumption parameters, to generate the energy consumption profile, the fractional consumption parameters including the fractional processor utilization parameters and fractional energy consumption parameters.

7. A method to generate energy consumption profiles for a plurality of computing systems, the method comprising:
   identifying a normalization factor corresponding to each of the plurality of computing systems, wherein the normalization factor indicates configuration of a processor of a computing system with respect to a reference processor;
   normalizing, based on the normalization factor, processor utilization parameter corresponding to each of the plurality of the computing systems, wherein the processor utilization parameter is indicative of a percentage of time for which the processor of the computing system is being used for processing instructions;
   determining, for each of the plurality of computing systems, a fractional processor utilization parameter, based on a corresponding normalized processor utilization parameter wherein the fractional processor utilization parameter of the computing system is a ratio of the normalized processor utilization parameter to a data-center consumption parameter corresponding to processor utilization, the data-center consumption parameter being indicative of cumulative sum of normalized processor utilizations of the plurality of computing systems; and
   generating an energy consumption profile based on the fractional processor utilization parameter corresponding to each of the plurality of the computing systems, wherein the energy consumption profile is indicative of an association between the processor utilization and energy consumption of the plurality of computing systems.

8. The method as claimed in claim 7, wherein the method further comprises averaging the processor utilization parameter and an energy consumption parameter for each of the plurality of computing systems over a predetermined time interval.

9. The method as claimed in claim 7, wherein the method further comprises determining, for each of the plurality of the computing systems, a fractional energy consumption parameter and wherein the fractional energy consumption parameter is a ratio of the energy consumption parameter and a data-center consumption parameter corresponding to the energy consumption, and wherein the energy consumption profile is generated based on the fractional energy consumption parameter.

10. The method as claimed in claim 7, wherein generating the energy consumption profile comprises determining cumulative consumption parameters for the plurality of computing systems, based on fractional processor utilization parameters and fractional energy consumption parameters.

11. A computer-readable medium having embodied thereon a computer program for executing a method comprising:
   identifying a normalization factor corresponding to each of a plurality of computing systems, wherein the normalization factor indicates configuration of a processor of a computing system with respect to a reference processor;
   normalizing, based on the normalization factor, a processor utilization parameter corresponding to each of the plurality of computing systems, wherein the processor utilization parameter is indicative of a percentage of time for which the processor of the computing system is being used for processing instructions;
   determining, for each of the plurality of computing systems, a fractional processor utilization parameter, based on a corresponding normalized processor utilization parameter wherein the fractional processor utilization parameter of the computing system is a ratio of the normalized processor utilization parameter to a data-center consumption parameter corresponding to processor utilization, the data-center consumption parameter being indicative of cumulative sum of normalized processor utilizations of the plurality of computing systems; and
   generating an energy consumption profile based on the fractional processor utilization parameter corresponding to each of the plurality of computing systems, wherein the energy consumption profile is indicative of an association between the processor utilization and energy consumption of the plurality of computing systems.

12. The computer readable medium as claimed in claim 11, wherein the method further comprises averaging the processor utilization parameter for each of the plurality of computing systems over a predetermined time interval and averaging energy consumption parameter for each of the plurality of computing systems over the predetermined time interval.

13. The computer readable medium as claimed in claim 11, wherein the method further comprises determining, for each of the plurality of the computing systems, a fractional energy consumption parameter and wherein the fractional energy consumption parameter is a ratio of the energy consumption parameter and a data-center consumption parameter corresponding to the energy consumption, and wherein the energy consumption profile is generated based on the fractional energy consumption parameter.

14. The computer readable medium as claimed in claim 13, wherein generating the energy consumption profile comprises determining cumulative consumption parameters for the plurality of computing systems, based on the fractional energy consumption parameters and the fractional processor utilization parameters.

15. The computer-readable medium as claimed in claim 11, wherein the method further comprises receiving a plurality of consumption parameters for each of the plurality of computing systems from at least one resource measurement device, the plurality of consumption parameters including the processor utilization parameter and an energy consumption parameter.

* * * * *